United States Patent [19]

Spicer

[11] 4,141,591
[45] Feb. 27, 1979

[54] BI-DIRECTIONAL DUMP TRUCK

[76] Inventor: Randall O. Spicer, 76930 Iroquois Dr., Indian Wells, Calif. 92260

[21] Appl. No.: 785,508

[22] Filed: Apr. 7, 1977

Related U.S. Application Data

[60] Division of Ser. No. 630,406, Nov. 10, 1975, abandoned, which is a continuation-in-part of Ser. No. 446,914, Feb. 28, 1974, abandoned, which is a continuation-in-part of Ser. No. 224,200, Feb. 7, 1972, abandoned.

[51] Int. Cl.² ............................................. B60P 1/28
[52] U.S. Cl. .................................. 298/17.6; 180/77 S; 180/89.1; 214/143
[58] Field of Search ............... 180/77 S, 89.1, 89.14, 180/89.15, 89.12; 298/17.6, 38; 214/143, 142

[56] References Cited

U.S. PATENT DOCUMENTS

| | | | |
|---|---|---|---|
| 1,297,150 | 3/1919 | Greenleaf | 214/143 X |
| 2,072,998 | 3/1937 | Allin | 298/17.6 |
| 2,848,246 | 8/1958 | Ruf | 180/77 S |
| 3,182,605 | 5/1965 | Brasher | 180/77 S |
| 3,316,019 | 4/1967 | Flowers | 298/17.6 |
| 3,378,302 | 4/1968 | Doeglas | 298/17.6 X |
| 3,398,984 | 8/1968 | Asero | 180/89.1 |
| 3,620,458 | 11/1971 | Rath | 298/17.6 X |
| 3,720,047 | 3/1973 | Lely | 180/77 S |
| 3,750,834 | 8/1973 | Luft | 180/77 S |

FOREIGN PATENT DOCUMENTS 27422 12/1954 Finland .................................. 180/77 S

*Primary Examiner*—John P. Silverstrim
*Attorney, Agent, or Firm*—Paul A. Weilein

[57] ABSTRACT

A truck is operable to discharge its load at either of its two opposite ends and is provided with a cab that is movable selectively to positions outwardly beyond the two opposite ends of the truck frame. When the cab is at either end of the truck, controls in the cab are operable to drive the truck in the direction of that end. The cab may be mounted on a boom to swing between the two ends of the truck or the cab may travel between the two ends of the truck along a track that extends longitudinally of the truck.

18 Claims, 16 Drawing Figures

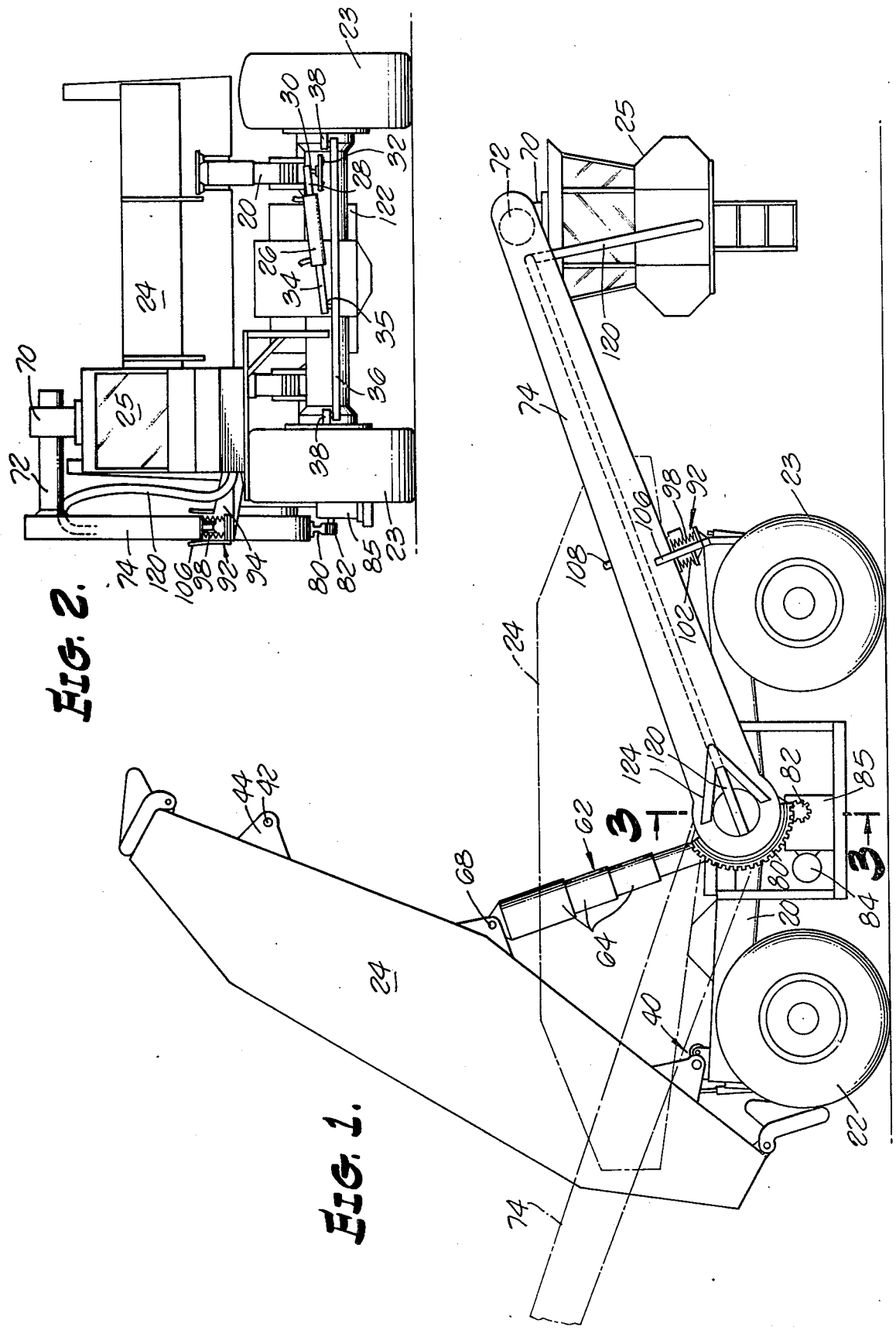

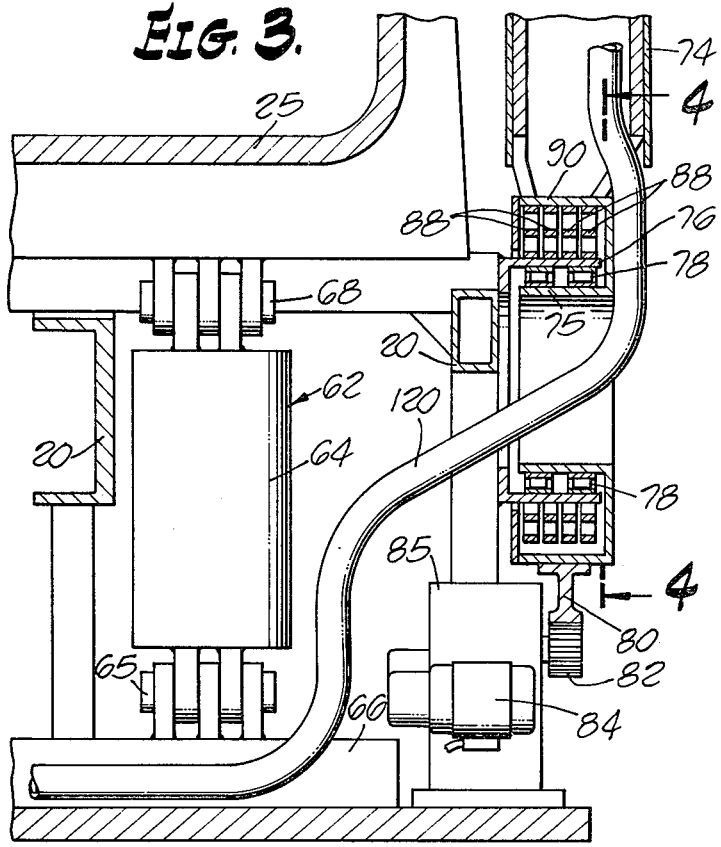
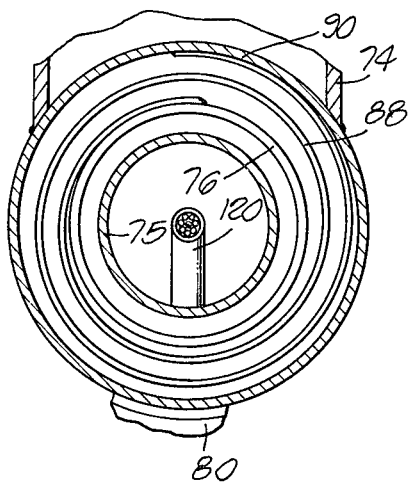
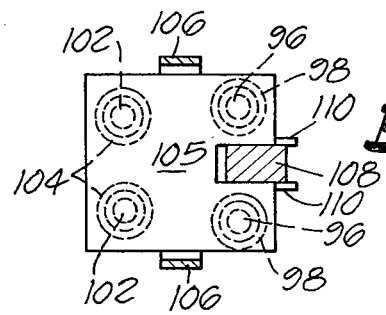
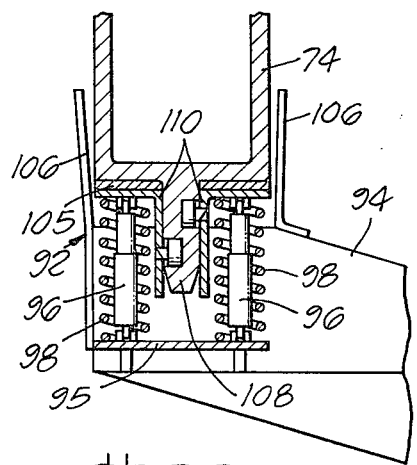
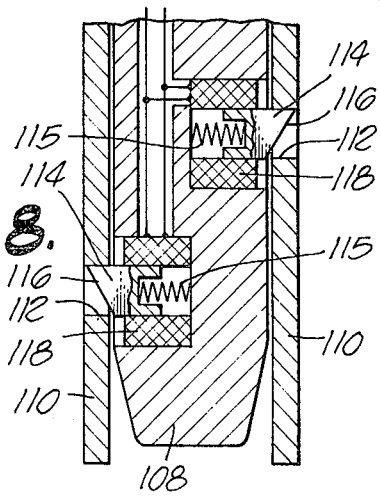

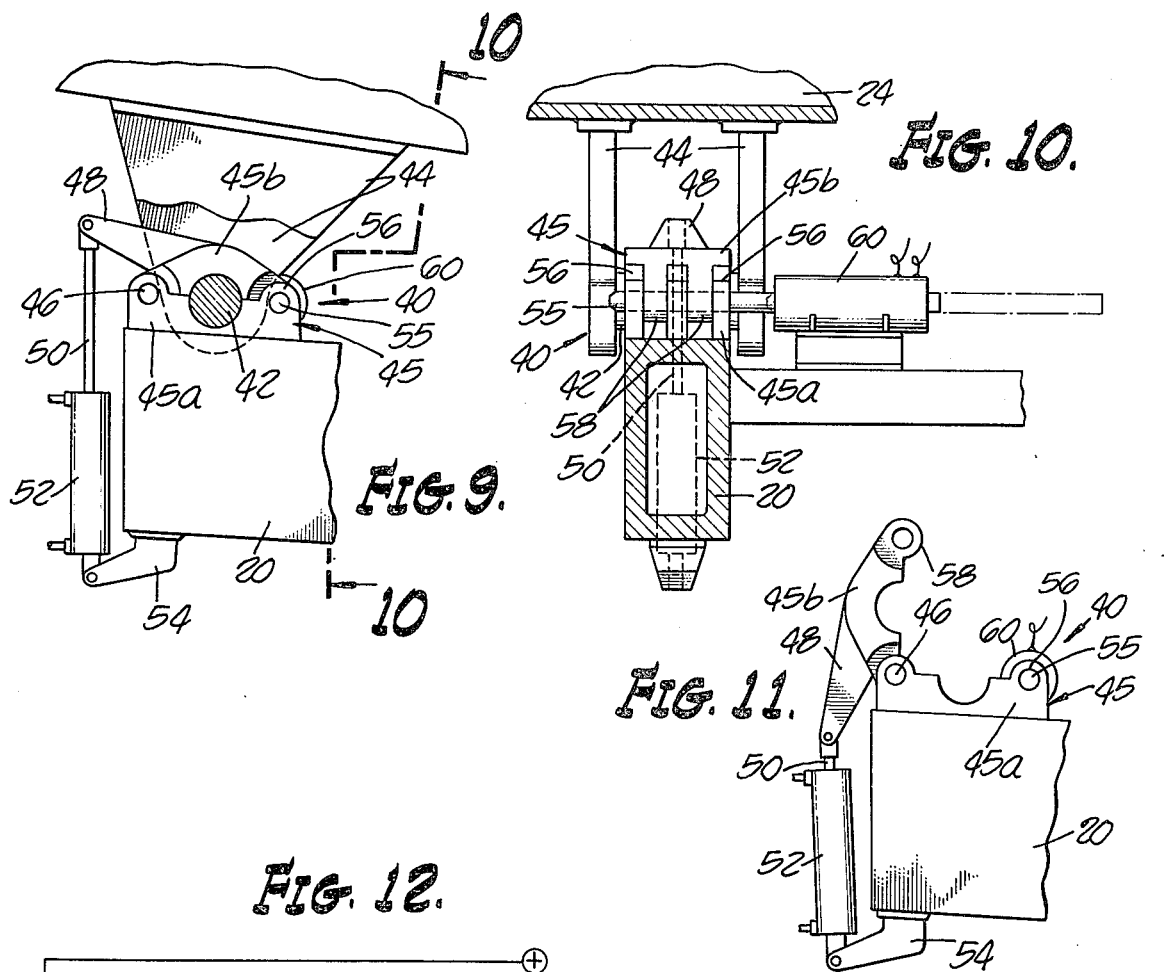
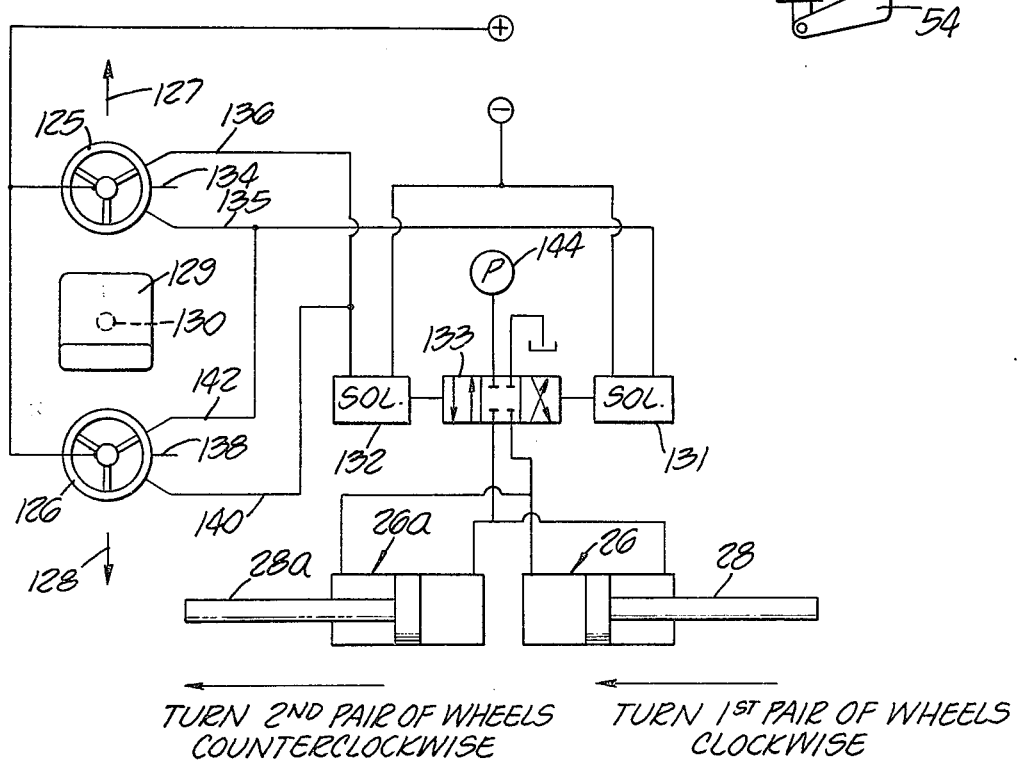
TURN 2ND PAIR OF WHEELS
COUNTERCLOCKWISE
TURN 1ST PAIR OF WHEELS
CLOCKWISE

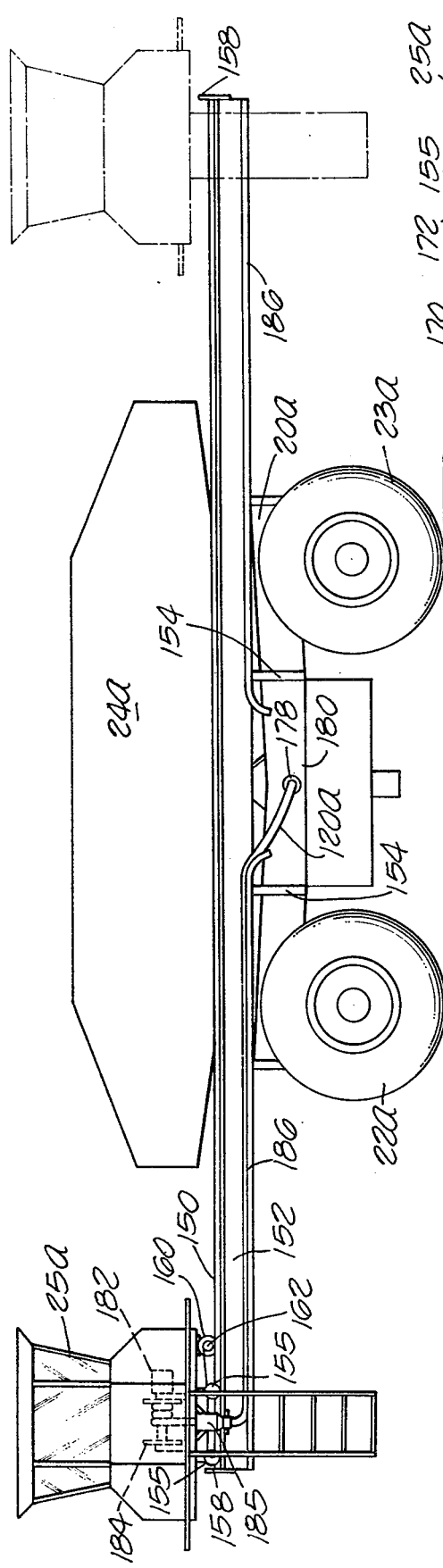
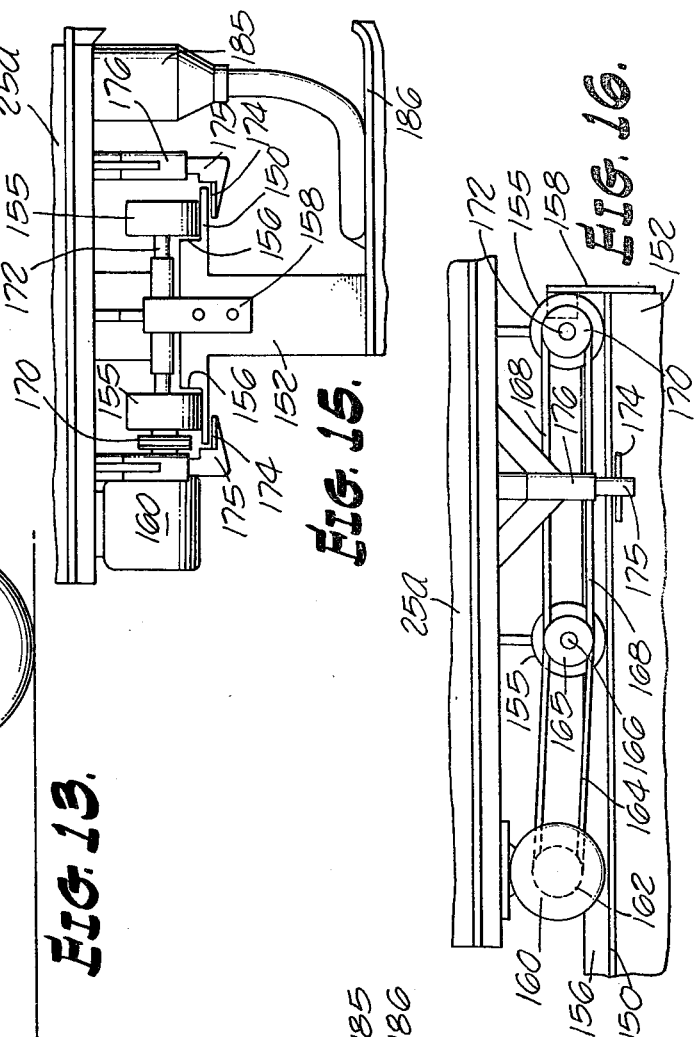
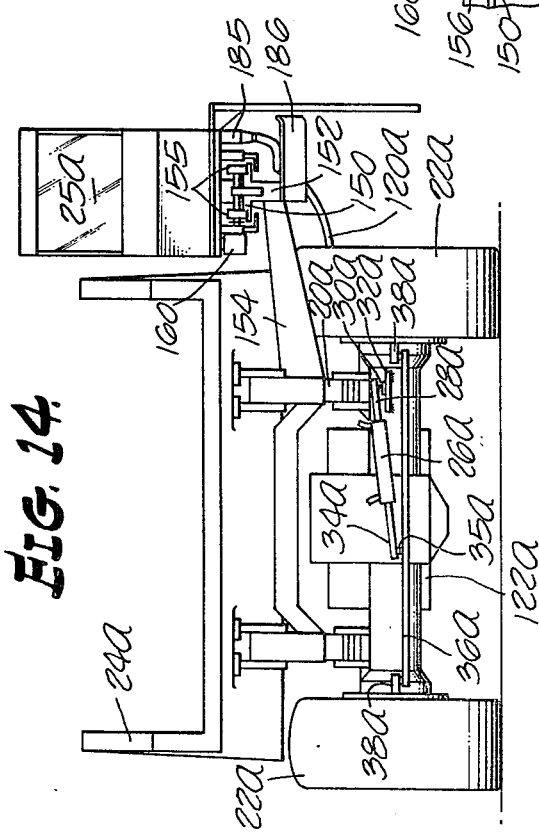

BI-DIRECTIONAL DUMP TRUCK

CROSS REFERENCE TO RELATED APPLICATION

This application is a division of my co-pending application Ser. No. 630,406, filed Nov. 10, 1975, now abandoned, which is a continuation-in-part of my abandoned application Ser. No. 446,914, filed Feb. 28, 1974, which is a continuation-in-part of my abandoned application, Ser. No. 224,200, filed Feb. 7, 1972.

BACKGROUND OF THE INVENTION

A conventional truck has a cab at its front end and the truck is usually loaded or unloaded at its rear end. If it is necessary to make a 180° change in direction to approach or leave an unloading zone or a loading zone, the driver must take time to make a U-turn if room and conditions permit. If there is not sufficient room for a U-turn but there is sufficient room for limited maneuvering, the driver may turn the truck around by appropriate steering to make partial turns while alternately driving the truck forward and rearward. Such maneuvering not only means loss of time but also involves serious hazard because the driver has only a limited view of the path of travel when he is backing the truck.

If an unloading zone or a loading zone is at the dead end of a narrow lane, the truck must back up along the lane to reach the zone in order to have the truck positioned properly for unloading or loading. Backing up a truck in this manner also involves loss of time and is also hazardous.

It is apparent, therefore, that there is pressing need for a truck construction that will eliminate the necessity for other than straightforward travel to reach or leave an unloading zone or a loading zone.

SUMMARY OF THE INVENTION

The invention may be embodied in various types of trucks including flatbed cargo trucks, concrete transit mix trucks, etc. The invention has special utility, however, for a dump truck. The present disclosure is directed to a dump truck by way of example and will provide adequate guidance for those skilled in the art who may have occasion to apply the same principles to other types of trucks.

The primary object of the invention is to provide a bi-directional truck which may be driven from either end with the driver at the leading end and may be loaded or unloaded at either end. Such a truck may be driven in one direction with the driver at the leading end of the truck to approach an unloading zone or a loading zone and then, without necessity for preliminary maneuver, the truck may be driven in the opposite direction to leave the unloading zone or the loading zone with the driver at the leading end of the truck, there being no necessity at any time for the driver to be at one end of the truck while driving the truck backwards in the opposite direction.

Broadly described, this primary object of the invention is attained by making the cab of the truck movable to the two opposite ends of the truck selectively.

In one practice of the invention, the cab is mounted on a boom that is pivoted centrally of two ends of the truck and the operator manipulates controls in the cab to swing the boom towards the two opposite ends of the truck selectively, and wherein the cab is positioned outwardly beyond the end of the truck frame. The cab has two sets of driving controls for use at the two limit positions respectively of the cab. The control system includes a flexible cable which incorporates a plurality of conductors and which follows the movement of the cab. The boom may be mounted on a hollow pivot with the cable extending through the hollow pivot.

In another practice of the invention the cab is movable to its opposite limit position along a track that extends longitudinally of the truck and projects beyond the ends of the truck frame. Here again, dual controls are provided and the control system includes a flexible electrical cable connected to the cab. Under control by the operator, the cab is driven along the track to its two opposite limit positions outwardly of the truck frame ends, and the cable extends from a mid-region of the track in either direction to follow the movements of the cab. Two trays extending in opposite longitudinal directions from the mid-region of the track support the cable when the cab is at its two limit positions respectively. The cab may be provided with means to reel in the cable as the cab approaches the mid-region from either longitudinal direction.

Positioning the cab beyond the truck end provides protection for the driver during the vulnerable loading and unloading operations, and also permits clear and unobstructed view of the material from a safe position.

The features and advantages of the invention may be understood from the following description and the accompanying drawings.

BRIEF DESCRIPTION OF THE DRAWINGS

FIG. 1 is a side elevational view of a dump truck embodying one practice of the invention;

FIG. 2 is an end elevation of the dump truck;

FIG. 3 is an enlarged fragmentary section taken along the line 3—3 of FIG. 1 showing the pivotal support for the boom that carries the cab of the truck;

FIG. 4 is a section taken as indicated on the line 4—4 of FIG. 3 showing the construction of a counterbalancing spring;

FIG. 5 is an enlarged portion of FIG. 1 showing one of the two yielding stops against which the boom comes to rest at its two opposite limit positions;

FIG. 6 is a section taken as indicated on the line 6—6 of FIG. 5 showing the upper surface of the yielding stop;

FIG. 7 is a section taken as indicated on the line 7—7 of FIG. 5 showing how the yielding stop incorporates means to latch the boom at its limit position;

FIG. 8 is an enlarged fragmentary sectional view showing structural details of the boom latch;

FIG. 9 is a fragmentary elevational view showing one of the releasable trunnions for pivotal support of the body of the dump truck;

FIG. 10 is a section taken as indicated by the angular line 10—10 of FIG. 9 showing structural details of the releasable trunnion;

FIG. 11 is a view similar to FIG. 9 showing the trunnion bearing opened for the purpose of releasing the complementary trunnion shaft;

FIG. 12 is a diagram of the control system for steering the truck;

FIG. 13 is a side elevation of a second embodiment of the invention;

FIG. 14 is an end elevation of the second embodiment;

FIG. 15 is a fragmentary end elevation of the longitudinal track with the cab thereon; and FIG. 16 is an enlarged portion of FIG. 13 showing power means for moving the cab along the track.

DESCRIPTION OF THE PREFERRED EMBODIMENT OF THE INVENTION

Referring to the first embodiment of the invention shown in FIGS. 1-12, a truck frame 20 supported by what may be termed a first pair of ground wheels 22 at a first end of the truck frame and a second pair of ground wheels 23 at the second end of the truck frame carries a dump body 24 and is provided with a cab 25 for the operator. Each of the two pairs of wheels may be steered by a corresponding mechanism at the corresponding end of the truck. As shown in FIG. 2, each steering mechanism includes a hydraulic power cylinder 26 with a piston rod 28 extending from one end thereof. The piston rod 28 is mounted by a ball joint 30 on fixed structure 32 of the truck frame 20 and the power cylinder 26 has an axial extension 34 which is mounted by a ball joint 35 on a cross rod 36, the opposite ends of the cross rod being pivotally connected to steering arms 38 of the corresponding pair of wheels.

The dump body 24 may be mounted on the frame 20 in various ways known to the art. For example, the Flowers U.S. Pat. No. 3,316,019 teaches how such a body may be adapted to dump towards its two opposite sides selectively, and the Koenig U.S. Pat. No. 2,953,408 discloses how such a body may be mounted on a truck frame to tilt to either side or to tilt to the rear end.

In this particular embodiment of the invention the body 24 is adapted to tilt towards its two ends selectively and for this purpose is mounted on one end of the truck frame 20 by a pair of releasable trunnion assemblies, each generally designated 40, and is mounted by a second similar pair of trunnion assemblies 40 at the other end of the truck frame. The construction of each of the four trunnion assemblies 40 may be understood by referring to FIGS. 9-11.

Each of the four releasable trunnion assemblies 40 includes a short trunnion shaft 42 that is mounted on the underside of the dump body 24 by a pair of spaced brackets 44. To cooperate with the trunnion shaft 42 a corresponding trunnion bearing 45 is mounted on the upper side of the truck frame 20. The trunnion bearing 45 is made in two sections, a lower section 45a being fixedly mounted on the truck frame and an upper section 45b being pivotally mounted on the lower section by a hinge pin 46. The upper trunnion section 45b is adapted to swing between a closed position shown in FIG. 9 and an open position shown in FIG. 11, and for this purpose has an integral arm 48 that is pivotally connected to the piston rod 50 of a hydraulic power cylinder 52. The power cylinder 52 is pivotally mounted at its lower end on an angular bracket 54 on the underside of the truck frame 20.

The upper section 45b of the trunnion bearing 45 may be locked in closed position by a locking pin 55 that extends through spaced ears 56 of the lower bearing section 45a and corresponding spaced ears 58 (FIG. 10) of the upper bearing section 45b. The locking pin 55 is unitary with the armature of a solenoid 60 and is normally held in its locking position by a spring (not shown) inside the solenoid. Whenever desired, solenoid 60 may be energized to retract the locking pin 55 to free the upper bearing section 45b to permit the upper bearing section to be swung to its open position by the corresponding power cylinder 52.

With one of the pairs of releasable trunnion assemblies 40 opened for release of the corresponding pair of trunnion shafts 42, lifting power may be applied to the underside of the body 24 intermediate the two ends of the body to tilt the body to dumping position as shown in FIG. 1.

It is contemplated that the dump body 24 will be tilted towards its two ends selectively by suitable hoist means located centrally of the two ends of the truck frame 20. In the construction shown in the drawings, the hoist means comprises a pair of hoists 62 spaced apart laterally of the truck frame, each hoist being of a well-known construction comprising a series of telescoping hydraulic cylinders 64. FIG. 3 shows a hoist 62 in its contracted state and FIG. 1 shows the hoist extended to tilt the dump body 24. The lower end of each hoist 62 is mounted by a pivot 65 on a subframe 66 of the truck and in like manner the upper end of each hoist is connected to the underside of the truck body 25 by pivot means 68.

The cab 25 has a bearing 70 on its upper side by means of which it is pivotally suspended from a laterally extending arm 72 at the outer end of a boom 74, of a length to project beyond the ends of the truck frame, that is pivotally mounted on the side of the truck frame 20 midway between the two ends of the frame. The boom 74 is mounted on hollow pivot means of the construction shown in FIGS. 3 and 4 wherein a short cylinder 75 that is integral with the boom is journalled in a fixed cylinder 76 on a side of the truck frame by means of roller bearing elements 78. The inner end of the boom extends beyond the fixed cylinder 75 and is provided with a gear segment 80 that is in mesh with a power driven pinion 82. The pinion 82 is driven by a motor 84 through reduction gearing in a gear box 85.

Preferably, the boom is provided with suitable counter-balance means to reduce the load on the motor 84. For this purpose four leaf springs 88 are coiled around the fixed cylinder 76 with the inner ends of the leaf springs anchored to the fixed cylinder and with the outer ends of the leaf springs anchored to an outer cylinder 90 that is united with the boom 74. Two of the leaf springs 88 may be wound in one rotary direction with the other two wound in the opposite rotary direction. As the boom swings downward from a central vertical position towards either of its two opposite limit positions two of the four leaf springs 88 are tightened progressively to tend to restore the boom to its upright position.

When the boom 74 swings to either of its two limit positions to place the cab 25 at one of its two limit positions, the boom comes to rest against a corresponding yielding stop means that is generally designated 92 in FIGS. 1 and 2 and which is mounted on a corresponding bracket 94 that extends laterally from the side of the truck frame 20.

As indicated in FIG. 5, each of the two stop means 92 has a base flange 95 which supports the lower ends of a pair of relatively long shock absorbers 96 and a corresponding pair of relatively long coil springs 98 that surround the shock absorbers. A second base flange 100 supports a pair of shorter shock absorbers 102 surrounded by corresponding coil springs 104. Each stop means is further provided with an upper support plate 105 that is yieldingly supported by the four springs 98, 104 and receives the weight of the boom 74, the support plate being flanked by a pair of slightly divergent guide arms 106.

Preferably, means is provided to releasably latch the boom 74 at its two opposite limit positions, respectively, and for this purpose the boom is provided with two opposite integral projections 108 which serve as latch members in cooperation with the two yielding stop means 92. To provide a socket for a latch member 108 the upper support plate 105 of each stop means is cut away to form a rectangular recess, as shown in FIG. 6, and the underside of the support plate is provided with a pair of short angle irons 110 which form opposite side walls of the socket. As best shown in FIG. 8, the two angle irons 110 are provided with apertures 112 for engagement by corresponding latch dogs 114 that are slidingly mounted in the latch member 108, the two latch dogs being biased to their latching positions by corresponding coil springs 115. The two latch dogs 114 are formed with bevelled leading faces 116 by virtue of which they automatically engage the apertures 112 in response to entry of the latch member into the socket. Each of the latch dogs 112 is the armature of a corresponding solenoid 118, the two solenoids being remotely controlled. Preferably, the arrangement is such that the four coil springs 98, 104 are under compression when the boom is latched, the springs expanding to boost the boom out of its limit position when the boom is released.

The control system of the truck includes numerous circuits and portions of the circuit wires are incorporated in a flexible electrical cable or conduit 120 that terminates at suitable controls in the cab 25. The electrical conrols in the cab are effective to carry out the following operations: to operate the motor 84 for swinging the boom 74 between its two limit positions; to energize the solenoids 118 for unlatching the boom at its two limit positions; to extend and retract the power cylinders 52 for closing and opening the trunnion bearings 45; the energize the solenoids 60 selectively to unlock the closed trunnion bearings 45; to extend and retract the two hoists 62 for the purpose of dumping loads; to control the power plant of the truck which is located under the truck frame 20 and which is designated 122 in FIG. 2; and to actuate the power cylinders 26 for steering the truck.

The cable or flexible conduit 120 extends from the cab to the boom 74 and extends along the interior of the boom as indicated in FIG. 1 where it can be seen that the cable or flexible conduit enters the hollow pivot means of the boom. Preferably, a V-shaped guard 124 on the boom shields the exposed portion of the cable or conduit against impacts when the truck is travelling with the boom extending towards the leading end of the truck. As shown in FIG. 3, the cable or flexible conduit 120 extends through the inner cylinder 75 of the boom pivot assembly and extends along the subframe 66 under the truck frame to a point where the various wires fan out to the corresponding control components.

OPERATION

The manner in which the bi-directional dump truck functions for its purpose may be readily understood from the foregoing description. When the dump truck is travelling towards a destination with the cab 25 suspended at the leading end of the truck, the boom 74 is releasably latched in place by the corresponding yielding stop means 92 and the dump body 25 is in its normal position with the four trunnion shafts 42 engaged by the four locked trunnion bearings 45. The operator in the cab 25 operates the power plant, changes gears, and steers the truck by remote control. When the truck reaches a dump site with the cab 25 suspended above the dump site, the operator in the cab manipulates to energize the solenoids 118 for unlatching the boom and manipulates a control to energize the motor 84 to swing the boom to the opposite trailing end of the truck. The operator then manipulates controls to energize the two solenoids 60 at the leading end of the truck to unlock the two corresponding trunnion bearings 45 at the leading end. The operator then causes the power cylinders 52 to retract to open the two forward trunnion bearings 45 to release the corresponding two forward trunnion shafts 42. The operator then causes the two hoists 62 to extend to tilt the body 24 to dumping positions as shown in FIG. 1.

When the load is dumped the operator retracts the two hoists 62 to lower the dump body 24 to its normal horizontal position and thereby cause the two trunnion shafts 42 to seat in the lower sections 40a of the corresponding two open trunnion bearings 40. The operator then energizes the corresponding solenoids 60 to retract the locking pins 55 and with the locking pins retracted the operator actuates the two corresponding power cylinders 52 to extend the piston rods 50 to close the two open trunnion bearings 45. The operator then deenergizes the corresponding two solenoids 60 to cause the corresponding two locking pins 55 to advance to their positions to lock the trunnion bearings.

The dump truck must back away from the dump site after the load is dumped, but the cab is now at the end of the truck that becomes the leading end for travel away from the dump site.

THE STEERING CONTROL SYSTEM

FIG. 12 is a diagram of the steering control system wherein the cab is equipped with two steering wheels 125 and 126 at opposite ends of the cab to be used alternately for steering the truck in two opposite directions.

When the truck travels in the first direction indicated by the arrow 127, the operator faces in that direction and is seated behind a steering wheel 125, but when the truck travels in the second direction indicated by the arrow 128, the operator faces in the second direction and is seated behind a steering wheel 126. The diagram shows a seat 129 for the operator that is swivelled on a pivot 130 to rotate the face in the two opposite directions selectively.

As indicated by the diagram, the two steering wheels 125, 126 are connected to one side of an electric control circuit and two solenoids 131 and 132 controlling a 3-position-4-connection directional valve 133 are connected to the other side of the circuit. As indicated diagrammatically, steering wheel 125 has a contact 134 that energizes a wire 135 when the steering wheel is rotated clockwise away from a neutral position and energizes a wire 136 when the steering wheel is rotated counterclockwise. In like manner, the steering wheel 126 has a similar contact 138 that energizes a wire 140 when the steering wheel is turned clockwise away from neutral and energizes a wire 142 when the steering wheel is rotated counterclockwise. Wires 135 and 142 are connected to solenoid 131 and wires 136 and 140 are connected to solenoid 132.

When solenoid 131 is energized, a hydraulic pump 144 is connected to the right end of the previously mentioned power cylinder 26 that controls the previously mentioned first pair of ground wheels 22 at the first end of the truck frame by means of a piston rod 28 and the pump is also connected to the right end of a second power cylinder 26a that has a piston rod 28a to control the second pair of ground wheels 23 at the second end of the truck frame. When solenoid 132 is energized, pump 144 is connected to the left end of the first power cylinder 26 and is also connected to the left end of the second power cylinder 26a. Thus, when solenoid 131 is energized, piston rod 28 retracts to turn the first pair of wheels 22 clockwise and the piston rod 28a extends to turn the second pair of wheels counterclockwise. On the other hand, when solenoid 132 is energized, piston rod 28 extends to turn the first pair of wheels 22 counterclockwise and piston rod 28a retracts to turn the second pair of ground wheels 23 clockwise.

THE SECOND EMBODIMENT OF THE INVENTION

Many features of the second embodiment of the invention shown in FIGS. 13-16 are common to the first embodiment, including the manner in which the dump body 24a is mounted on the truck frame 20a and the manner in which the two pairs of wheels 22a are steered. The essential difference is that the cab 25a moves between its two opposite positions along a straight track 150 that is the upper portion of a longitudinal beam 152. The beam 152 is supported along one side of the body 24a by spaced brackets 154 that extend laterally from the truck frame 20a.

The cab 25a is mounted on four wheels 155 and the track 150 is formed with two opposite longitudinal shoulders 156 to keep the wheels on the track, there being two stops 158 at the opposite ends, respectively, of the track to keep the cab from running off the track. To cause the cab 25a to travel along the track 150, a motor 160 under the cab is controlled from the interior of the cab and drives a sheave 162 which is connected by a belt 164 to a sheave 165 on a shaft 166 that carries one of the pairs of wheels 155. A second sheave (not shown) on the shaft 166 is connected by a belt 168 to a sheave 170 on a second shaft 172 that carries the other pair of wheels 155.

It is contemplated that suitable brake means will be provided to decelerate the cab 25a when desired, and to immobilize the cab at its two limit positions. As best shown in FIG. 15, a pair of brake shoes 174 to engage the undersurface of the track 150 may be carried by plungers 175 that extend downward through guide cylinders 176 on the underside of the cab. The plungers 175 may be suitably controlled to extend to free the cab for travel and to retract to frictionally retard the cab or to immobilize the cab.

The control system includes the usual electrical cable or flexible conduit 120a which extends from the cab 25a to a central region of the truck frame where the cable enters a port 178 of a housing 180. When the motor 160 is energized to move the cab 25a from one of its two limit positions to the other limit position, a motor 182 in the cab is also energized to actuate a reel 184 by means of a friction clutch (not shown) to reel in the cable or flexible conduit 120a through a guide sleeve 185 on the underside of the cab. When the cab reaches the mid-region above the housing 180, the motor 182 is reversed to pay out the electrical cable or flexible conduit. To support the cable or flexible conduit 120a when the cab 25a is at its two opposite limit positions, a pair of longitudinal trays 186 are mounted on the beam 152 longitudinally of the beam with each tray extending from the central region to a corresponding end of the track.

It is apparent that this second embodiment of the invention functions in substantially the same manner as the first embodiment with the cab 25a always at the leading end of the truck when the truck is moving to or from a dump site or loading zone. One advantage over the first embodiment is that the cab may be at the end of the truck towards which the body is tilted so that the operator in the cab can observe the load as it is being dumped.

My description in specific detail of the selected embodiments of the invention will suggest various changes, substitutions and other departures from my disclosure within the spirit and scope of the appended claims.

I claim:
1. In a power-driven dump truck vehicle, the combination of:
   a wheel-support frame;
   a body mounted on the frame to carry a load, comprising pivotal mounting means near the two ends, respectively, of the vehicle frame,
   each of said pivotal mounting means including trunnion means mounted on said body and complementary trunnion bearing means mounted on said vehicle frame, said trunnion bearing means comprising a pivotally mounted upper section and a fixedly mounted lower section;
   remotely controlled means including fluid-pressure-actuated means to swing each of said upper sections between opened and closed positions;
   a cab movable between two limit positions near the opposite ends, respectively, of the vehicle to dispose the cab in a leading position relative to the travel direction;
   means operable from inside the cab to shift the cab to said two limit positions selectively, said cab being equipped with controls to drive and steer the vehicle from either end of the vehicle; and
   means operable to tilt the body towards the two ends of the vehicle selectively to dump its load whereby with the cab at one end of the loaded vehicle the vehicle may be driven in the direction of said one end to a dump site, whereupon the cab may be shifted away from said one end of the vehicle to the opposite end of the vehicle and then the body may be tilted towards said one end of the vehicle to dump the load.

2. A combination as set forth in claim 1 which includes means to releasably lock the upper section of each trunnion bearing means in closed position.

3. A combination as set forth in claim 2 in which said locking means is spring biased to keep the upper section locked and which includes remotely controlled means to release the locking means in opposition to its bias.

4. A combination as set forth in claim 1 which includes a track extending longitudinally along one side of said frame between the driving ends of the vehicle with the cab being movable on the track to said limit positions at the two opposite ends of the frame, respectively.

5. A combination as set forth in claim 4 which includes means to decelerate the cab as it moves along the track.

6. A combination as set forth in claim 5 which includes power means on the cab controlled by the operator in the cab to drive the cab along the track.

7. A combination as set forth in claim 5 in which the vehicle has a control system including a plurality of flexible electrical conductors connected to the cab to follow the movements of the cab, said conductors extending from the cab to a region adjacent the track centrally of the two ends of the track.

8. A combination as set forth in claim 7 which includes two elongated trays to support the plurality of conductors, said trays respectively extending from said region towards the two ends of the track.

9. A combination as set forth in claim 8 in which said plurality of conductors are incorporated in a flexible cable and which includes means on the cab to reel in the cable as the cab moves from either end of the track towards said central region.

10. A combination as set forth in claim 4 which includes means on the cab to releasably engage the track to decelerate movements of the cab along the track and to immobilize the cab at its two limit positions.

11. In a power-driven dump truck vehicle, the combination of:
   a wheel-supported frame;
   a body mounted on the frame to carry a load;
   a cab mounted on a boom supported to swing between two limit positions near the opposite ends, respectively, of the vehicle to dispose the cab in a leading position relative to the travel direction;
   two yielding stop means to decelerate the boom as it approaches its two opposite limit positions, respectively;
   two latch means to latch the boom at its two limit positions, respectively, each of said latch means latching the boom in opposition to force created by the corresponding yielding stop means;
   means operable from inside the cab to shift the cab to said two limit positions selectively, said cab being equipped with controls to drive and steer the vehicle from either end of the vehicle; and
   means operable to tilt the body towards the two ends of the vehicle selectively to dump its load whereby with the cab at one end of the loaded vehicle the vehicle may be driven in the direction to said one end to a dump site, whereupon the cab may be shifted away from said one end of the vehicle to the opposite end of the vehicle and then the body may be tilted towards said one end of the vehicle to dump the load.

12. A combination as set forth in claim 11 in which each of said latches is responsive to movement of the boom to latch the boom in response to arrival of the boom at its corresponding limit position;
   and which includes means operable from the cab to release said latches.

13. In a power-driven dump truck vehicle, the combination of:
   a wheel-supported frame;
   a body mounted on the frame to carry a load;
   a cab mounted on a boom supported to swing between two limit positions near the opposite ends, respectively, of the vehicle to dispose the cab in a leading position relative to the travel direction;
   latch means to releasably engage the boom at its two limit positions, respectively;
   resilient yielding means to decelerate the boom as it approaches each of its two limit positions and to urge the boom out of its two limit positions in opposition to the two corresponding latch means;
   means operable from inside the cab to shift the cab to said two limit positions selectively, said cab being equipped with controls to drive and steer the vehicle from either end of the vehicle; and
   means operable to tilt the body towards the two ends of the vehicle selectively to dump its load whereby with the cab at one end of the loaded vehicle the vehicle may be driven in the direction of said one end to a dump site, whereupon the cab may be shifted away from said one end of the vehicle to the opposite end of the vehicle and then the body may be tilted towards said one end of the vehicle to dump the load.

14. In a power-driven dump truck vehicle, the combination of:
   a wheel-supported frame;
   a body mounted on the frame to carry a load;
   a cab mounted on a boom supported to swing in an upright arc between two limit positions near the opposite ends, respectively, of the vehicle to dispose the cab in a leading position relative to the travel direction;
   means to counterbalance the boom at its two opposite limit positions comprising spring means and means to stress the spring means progressively in response to movement of the boom in either direction from the center of its arc;
   means operable from inside the cab to shift the cab to said two limit positions selectively, said cab being equipped with controls to drive and steer the vehicle from either end of the vehicle; and
   means operable to tilt the body towards the two ends of the vehicle selectively to dump its load whereby with the cab at one end of the loaded vehicle the vehicle may be driven in the direction of said one end to a dump site, whereupon the cab may be shifted away from said one end of the vehicle to the opposite end of the vehicle and then the body may be tilted towards said one end of the vehicle to dump the load.

15. A combination as set forth in claim 14 wherein the cab is pivotally suspended from the outer end of the boom.

16. A combination as set forth in claim 12 in which the boom is mounted on hollow pivot means;
   and in which the control system for the vehicle includes a flexible electrical cable extending from the cab along the boom and through the hollow pivot means.

17. A combination as set forth in claim 14 in which said spring means is coiled about the pivot axis of the boom.

18. A combination as set forth in claim 17 in which the spring means comprises two oppositely coiled springs.

* * * * *

UNITED STATES PATENT AND TRADEMARK OFFICE
CERTIFICATE OF CORRECTION

PATENT NO. : 4,141,591
DATED : February 27, 1979
INVENTOR(S) : RANDALL O. SPICER It is certified that error appears in the above-identified patent and that said Letters Patent are hereby corrected as shown below:

Column 6, line 3, --controls-- should be inserted after "manipulates"; line 46, "the" (first occurrence) should read --to--.

Signed and Sealed this

Twenty-ninth Day of May 1979

[SEAL]

Attest:

RUTH C. MASON
Attesting Officer

DONALD W. BANNER
Commissioner of Patents and Trademarks